Dec. 11, 1956  B. H. LOCKE  2,773,607
MATERIALS PILING DEVICES
Filed Sept. 27, 1954

INVENTOR
Burton H. Locke

United States Patent Office 2,773,607
Patented Dec. 11, 1956

2,773,607

MATERIALS PILING DEVICES

Burton H. Locke, Framingham, Mass.

Application September 27, 1954, Serial No. 458,340

16 Claims. (Cl. 214—6)

This invention relates to a device to facilitate the manual piling of cartons or packages or other articles of merchandise onto a carrying platform such as a skid or pallet or other structure in successive layers to form a stacked load thereon for transportation by means of a portable lift truck.

One object of the invention is to provide a simple device that will facilitate the manual placing of the packages onto the platform by eliminating the usual manual lifting of the packages to the different level required to place them into a pile onto the platform and to eliminate the usual manual carrying of the packages from an accumulating conveyor or an accumulating point to the platform.

Another object is to elevate the surface of the pile on which each layers of packages is to be formed to a predetermined fixed level by pivoted means rather than sliding means and thereby afford a simple construction that can be operated by a simple means. Also the resulting pivoted platform provides inclined surfaces down which the packages can be slid with the aid of gravity to their positions on the load.

The provision of the loading of the packages at a fixed level permits the conveying of the packages to the said fixed level and thereby eliminates manual carrying of the packages from an accumulating point to the platform which would normally set on the floor a distance from the point of accumulation.

Another object of the invention is to provide rollers under the platform in cooperation with a gravity discharge conveyor on which the platform may be rolled out from the device and onto the discharge conveyor to be carried away by gravity after it is completely loaded.

Another object is to provide a driven conveyor that will convey packages from an infeed conveyor to the predetermined fixed level for manual sliding onto the platform in arranged pattern layers.

The main objective of the present invention is to improve the device shown and described in my prior application filed January 18, 1954, Serial No. 404,525, and now abandoned, of which said application is a continuation-in-part to further facilitate the manual piling, and especially the locating, of the packages on the platform. One improvement is the addition of a guide fence against which the packages can be located laterally in the manual operation of forming the packages into pattern formed layers on the platform so as to insure that the packages are formed in an even vertical pile.

I conceive to provide means to lower the fence automatically into position to serve as a guide when the elevator is swung upwardly to receive the packages, and means to automatically raise the fence to permit discharge of the loaded platform when the elevator reaches its maximum "down" position whereat the loaded platform is normally discharged so as to eliminate any manual movement requirement to operate the fence.

Another improvement over my said prior device is to provide adjustable means to facilitate locating the platform in either or both horizontal directions, as required, relative to the respective fences against which the packages are to be located so as to facilitate the vertical piling of the packages in a predetermined fixed relationship to the outside edges of the platform. This feature is to provide for loads which due to their horizontal dimensions overhang the platform and others for the same reason underhang the platform and still others that are flush with the edges of the platform.

Figures 1, 2, 3:
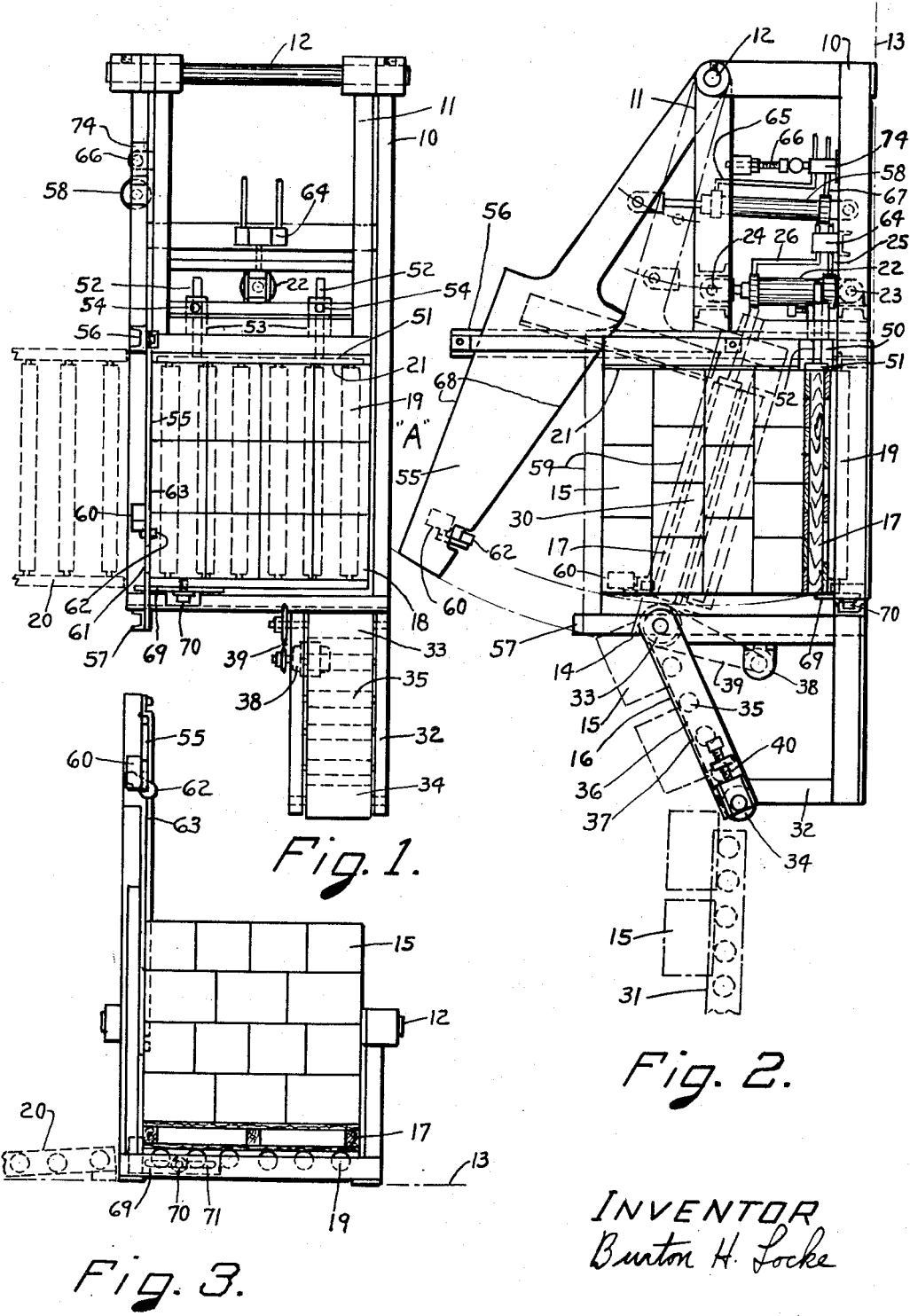
Figure 1 is a plan view of my improved piling device with a completely loaded platform thereon and in position to be discharged.
Figure 2 is a side elevation of the same.
Figure 3 is an elevation taken at the infeed end with the infeed conveyor not shown.

My improved materials piling device comprises a stationary frame structure 10 that generally rests on a floor and supports a swingable rigid elevating structure 11 which is pivoted at one end thereof within frame 10 on a shaft 12 which is generally positioned about midway between the floor 13 and a predetermined level 14 where packages, or other articles of merchandise, 15 are conveyed by a driven conveyor 16 for manual sliding onto a portable loading platform; pallet; skid or the like, 17 in successive manual formed layers.

The pivot point 12 of structure 11 is positioned a distance horizontally from the platform 17 and vertically substantially midway between the floor 13 and the predetermined level 14 so that the said platform and all layers of packages formed thereon will swing in close relationship to the infeed point 14 to facilitate handling of the packages from the said conveyor to the platform or to the pile of packages thereon. In other words, the platform with its load of packages is pivoted substantially central to the floor 13 and the level 14 for the purpose of minimizing the horizontal movement of the loaded platform relative to the infeed point 14 for the purpose set forth.

The other end 18 of structure 11 is adapted to receive and support the platform 17 and generally free rotatable rollers 19 are provided under the platform so that the same can be rolled off of the device after it is completely loaded, as shown in the drawing. A gravity roller conveyor 20, shown in dotted lines, is generally placed adjacent to the device as shown to receive the loaded platform when it is rolled off of the rollers 19 and convey it away by means of gravity. However, the rollers could be replaced with a fixed base for the platform to rest on and in such instance a lift truck would be required to lift the loaded platform off of the device. Therefore, it is obvious that the use of rollers 19 in conjunction with the conveyor 20 simplifies the operation of removing the loaded platform.

There is an upright rigid structure 21 disposed on the structure 11 for the layers of packages to be positioned against for retaining the same in position until the platform is completely loaded and thereby afford an even compact load. The friction of the packages against the structure 21 will retain the load in place during the downward movement of the structure 11 and such will be released substantially when the structure 11 reaches the bottom of its travel and becomes level horizontally. The load is then generally free to be rolled out onto conveyor 20.

In the present instance, a hydraulic cylinder 22 is pivotly attached to frame 10 at 23 and to structure 11 at 24 and is utilized to swing structure 11 up and down within frame 10. Oil is fed under pressure to the lower end of the cylinder 22 through a pipe, such as indicated at 25, to swing structure 11 upward. The oil is fed to the upper end of said cylinder through a pipe, such as indicated at 26, to cause the said structure to swing downward as required. A conventional hydraulic power unit could be utilized to supply oil under pressure to the cylinder and a 4-way valve such as a double solenoid valve 64 could be arranged to control the flow of the oil to the cylinder. It is obvious that other conventional means to swing the structure could be employed in place of the hydraulic cylinder shown.

The structure 11 is swung upwardly to the position shown in broken lines 30 which positions the top surface of the platform 17 at the predetermined level 14 to receive packages for manual sliding down the inclined platform into position to form the first layer thereon. After the first layer is completely formed onto the platform the structure 11 is lowered until the outer top edge of the first layer of packages is at level 14 to receive packages for the manual sliding down the inclined top surface of the first layer to form the second layer on the platform and so on until the platform is completely loaded. After the last layer is formed onto the pile the structure 11 is lowered to its maximum low position where the loaded platform can be rolled off of the device as set forth, and an empty platform can be manually rolled onto the device to replace it.

The operator generally stands on the side "A" as indicated in Figure 1 and the level 14 generally is about 4 feet above the floor so that the packages can be easily reached and slid onto the platform, or onto another layer of packages as the case may be and arranged in pattern form.

It will be noted that all of the layers of packages except the top layer are slid down a surface that is inclined away from the infeed position. This facilitates the sliding of the packages into place from the infeed level 14 due to the effect of gravity assisting in the movement of the packages. Also any lifting of the packages manually is avoided which is one of the main objects of the invention.

The conveyor 16 could be of any conventional type of elevating conveyor that will receive packages from a gravity line conveyor such as indicated at 31 and elevate them to the fixed elevation 14. In this instance the conveyor comprises a frame 32 supporting main rolls 33 and 34 and intermediate carriers rolls 35. An endless belt 36 passes over the main rolls 33 and 34 and the top package conveying portion 37 thereof is supported by the rolls 35. The conveyor is driven by a slow speed geared motor 38 through a chain drive 39 operatively connecting the motor 38 to the main roll 33. Main roll 34 has obvious conventional take-up means as indicated at 40 to provide means of keeping the belt 36 in proper operating tension.

The foregoing is a concept of the device shown and described in my said prior application. The specification to follow sets forth conceived changes and additions to improve the said prior device for the purpose of rendering the same more effective operationally.

There is an undercut area 50 at the bottom of the upright fence structure 21 which has height to receive the platform 17 but not to include any normal package that may be loaded onto the platform.

There is a bar member 51 adjustably mounted within the area 50 to abut the platform 17 and thereby position the same relative to the structure 21. The bar 51 has a plurality of rod portions 52 that have sliding engagement in bosses 53 provided on the structure 21 and set screws 54 are provided to secure the rods 52 in any predetermined adjusted position in bosses 53 and thus anchor the bar in any such adjusted position.

When an underhung load of packages is required to be formed on the platform 17, the bar 51 is adjusted within the recess area 50. When it is required that the packages overhang the platform, bar 51 is adjusted outside the recessed area 50 to position the platform outside of fence structure 21 so that when the packages are formed against the fence they will overhang the platform.

There is a movable upright plate type of fence 55 which is, in this instance, pivoted on shaft 12 and is guided by upright posts 56 and 57 which are rigid to base member 10. Fence 55 is disposed to be swung up and down by a hydraulic cylinder 58. The fence 55 when in its "down" position, as shown by dotted lines 59, serves as a barrier for the operator to form the packages against and thereby insures the forming of an even vertical pile of packages in lateral direction on the platform 17.

An electrical normally open limit switch 60 is rigidly mounted on rear side 61 of fence 55 and is disposed with its actuating roller 62 protruding beyond the front face 63 of the said fence so that it will contact and be actuated by packages placed against the fence adjacent to the said roller when the fence is in its "down" position.

The limit switch 60 is normally wired in series with a push-button disposed to actuate a double solenoid hydraulic 4-way valve 64, mounted on the base structure 10, in the direction to cause structure 11 to lower. Therefore, when a layer of packages is formed against the fence 55 limit switch 60 is closed and an actuation of the said push-button would cause the structure 11 to lower until the circuit is broken by the limit switch 60 being released by the packages passing down off of it. This would cause the structure 11 to come to a stop in proper position to receive the next layer of packages.

Another electrical push-button would normally be provided in another circuit to actuate the other solenoid of the 4-way valve 64 which would cause the valve to move in the other direction to effect the raising of structure 11. Therefore, the operation of the structure 11 could be controlled by two push-button stations, the first, in the order described, being marked "down" and the latter marked "up."

In this instance, there is a cam operated hydraulic 4-way valve 74 mounted on base structure 10 which is normally open to feed oil to the top of cylinder 58 through a pipe 65 and thus retain the fence 55 in its "down" position whenever structure 11 is raised, which is during the process of the platform 17 being loaded. After the platform 17 is completely loaded and the structure 11 is lowered to its maximum "down" position for the loaded platform to be discharged an adjusting 66, that has threaded engagement in structure 11, contacts and thereby actuates the valve 74 which causes oil to flow through a pipe 67 to the lower end of cylinder 58 which raises the fence 55 to the position shown in full lines 68. The raising of fence 55 allows space for the loaded platform to pass thereunder when being discharged from the device. Obviously, whenever the structure 11 is raised the valve 74 will be released and will return to its normal position which will cause the fence 55 to be lowered to its useful position in the loading of the platform.

A guide bar 69 is adjustably attached to structure 11 near one far corner thereof and is disposed so that, through the medium of a cap screw 70, which has threaded engagement in said structure, and a slot 71 for said screw being provided in said bar, it can be moved horizontally. Bar 69 serves as an adjustable means that can be set to indicate a predetermined desired location for the platform 17 relative to the fence 55 for a similar purpose that bar member 51 is located relative to the upright structure 21, as set forth above.

I do not wish to be confined to the exact details set forth as the same are susceptible to modification within the spirit and scope of the invention set forth.

I claim:

1. A device to facilitate the piling of articles of merchandise onto a carrying platform in successive layers comprising a stationary frame structure and a swingable structure pivotally mounted near one end thereof to the frame structure and disposed to swing upwardly, a portion of said swingable structure near the other end thereof being suitable to receive and support a said platform, means to convey articles of merchandise to a predetermined level above the structures at the platform supporting end thereof, the swingable structure being such as to receive and swing an empty said platform upwardly in position to facilitate the sliding of a layer of said articles thereon substantially at the said predetermined level and thereafter to swing downwardly therefrom intermittently to suitable positions to bring the top of each successive layer of articles that may be placed on the platform substantially at the said predetermined level to facilitate the sliding of each layer of articles onto the preceding layer respectively, and so on, until said platform is completely loaded with articles, and finally to permit the removal therefrom of any platform that may be loaded thereon, power means to accomplish the movement of the swingable structure, a substantial upright fence on the swingable structure intermediate the pivot point thereof and the platform supporting portion thereof for locating the packages thereagainst, adjustable means to position said platform in horizontal relationship to said fence, an upright movable package locating fence on one of the members disposed adjacent to and substantially perpendicular to the first said fence on the side opposite the side where an operator would normally manipulate the loading of a platform therefrom as set forth, means to raise the last said fence above any platform and any load of packages that may be formed thereon to permit the passing of any such loaded platform thereunder, means to facilitate positioning a said platform in horizontal relationship to the last said fence.

2. In combination, an article piling device as described in claim 1, rollers disposed in the device to support the platform, a gravity roller conveyor to afford conveyance of any platform away from the device normally after being loaded with said articles of merchandise and being moved out of the device and onto the gravity conveyor, and a driven conveyor to convey articles of merchandise to said predetermined level above the device for manual sliding onto the platform in the process of being loaded thereon.

3. A device as described in claim 1, with rollers in the swingable structure to support the platform and a gravity roller discharge conveyor to receive and convey away any platform that may be loaded in and then moved out of the device.

4. A device as described in claim 1, with a driven conveyor disposed to convey articles that may be received at a distance from the device to the said predetermined level above the structures.

5. A device to facilitate the piling of articles of merchandise onto a carrying platform comprising three main parts, one of said parts being a stationary base member, another of said parts being a swingable elevating member pivoted at one end thereof to the base member and having a platform supporting portion at the end opposite the first said end thereof, the pivoting point of the elevating member being disposed a distance from and vertically higher than the platform supporting portion thereof, the third said part being a driven conveyor to convey articles of merchandise to a predetermined level above the device at the platform supporting end thereof, power means to actuate the driven conveyor, and power means to actuate the elevating member up and down to facilitate the manual piling of any article of merchandise, that may be conveyed to said level, in pattern formed layers on any said platform that may be supported in the device, a substantial upright fence on the elevating member intermediate the pivoting point thereof and the platform supporting portion thereof for locating packages thereagainst, adjustable means to position said platform in horizontal relationship to said fence, an upright movable package locating fence on one of said members disposed adjacent to and substantially perpendicular to the first said fence on the side opposite the side where an operator would normally manipulate the loading of a platform therefrom as set forth, means to raise the last said fence above any platform and any load that may be formed thereon in said device to permit any such loaded platform to pass thereunder, means to facilitate positioning a platform in horizontal relationship to the last said fence.

6. A device as described in claim 5, with rollers in the swingable member to support the platform and a gravity roller discharge conveyor to receive and convey away any platform that may be loaded in and then moved out of the device.

7. A device as described in claim 5, with a driven conveyor disposed to convey articles that may be received at a distance from the device to the said predetermined level above the members.

8. A device to facilitate the piling of articles of merchandise onto a carrying platform comprising three main parts, one of said parts being a stationary base member, another of said parts being a swingable elevating member pivoted at one end thereof to the base member and having a platform supporting portion at the end opposite the first said end thereof, the pivoting point of the elevating member being disposed a distance from the platform supporting portion thereof, the third said part being a driven conveyor to convey articles of merchandise to a predetermined level above the device at the platform supporting end thereof, power means to actuate the driven conveyor, and power means to actuate the elevating member up and down to facilitate the manual piling of any articles of merchandise, that may be conveyed to said level, in pattern formed layers on any said platform that may be supported in the device, a substantial upright fence on the elevating member intermediate the pivot point thereof and the platform supporting portion thereof for locating packages thereagainst, an upright movable package locating fence on one of the members and disposed adjacent to and substantially perpendicular to the first said fence on the side opposite the side where an operator would normally manipulate the loading of a platform therefrom as set forth, means to raise the last said fence above any platform and any load that may be formed thereon in said device to permit any such loaded platform to pass thereunder, means to facilitate positioning said platform in horizontal relationship to the last said fence.

9. A device to facilitate the piling of articles of merchandise onto a carrying platform comprising three main parts, one of said parts being a stationary base member, another of said parts being a swingable elevating member pivoted at one end thereof to the base member and having a platform supporting portion at the end opposite the first said end thereof, the pivot point of the elevating member being disposed a distance from and above the platform supporting portion thereof, the third said part being a driven conveyor to convey articles of merchandise to a predetermined level above the device at the platform supporting end thereof, power means to actuate the driven conveyor, and power means to actuate the elevating member up and down to facilitate the manual piling of any articles of merchandise, that may be conveyed to said level, in pattern formed layers on any said platform that may be supported in the device, a substantial upright fence on the elevating member intermediate the pivot point thereof and the platform supporting portion thereof for locating packages thereagainst, an upright package locating fence on one of said members and disposed adjacent to and substantially perpendicular to the first said fence on the side opposite where an operator would normally manipulate the loading of a platform therefrom as set forth, means to raise the last said fence above any platform and any load that may be formed thereon in said device to permit any such loaded platform to pass thereunder.

10. A device to facilitate the piling of articles of merchandise onto a carrying platform comprising three main parts, one of said parts being a stationary base member, another of said parts being a swingable elevating member pivoted at one end thereof to the base member and having a platform supporting portion at the end opposite the first said end thereof, the pivot point of the elevating member being disposed a distance from and vertically higher than the platform supporting portion thereof, the third said part being a driven conveyor to convey articles of merchandise to a predetermined level above the device at the platform supporting end thereof, power means to actuate the driven conveyor, and power means to actuate the elevating member up and down to facilitate the manual piling of any articles of merchandise, that may be conveyed to said level, in pattern formed layers on any said platform that may be supported in the device.

11. In combination, an article piling device as described in claim 10, a driven conveyor to convey said articles of merchandise to said predetermined level above the device, rollers disposed in the device to support a said platform to receive the articles, and a gravity roller conveyor to afford conveyance of any said platform away from the device normally after being loaded with said articles of merchandise and being moved onto the gravity conveyor.

12. A platform loading device for use with apparatus discharging objects at a predetermined elevation comprising a frame, an elevating structure having a platform supporting section at one end adjacent the discharge point, a horizontal pivot member mounting the opposite end of the elevating structure to the frame at a point vertically disposed substantially midway between the elevation at which the objects are discharged and the elevation at which the platform supporting section of the elevating structure is horizontal, elevating means for the pivoted elevating structure, and control means for the elevating means to position the platform supporting section at any desired intermediate elevation.

13. A platform loading device as described in claim 12 wherein the elevating means for the elevating structure comprises vertically disposed lifting means pivotally mounted both to the frame and the elevating structure to permit angular adjustment of the lifting means as the elevating structure changes position.

14. A platform loading device comprising a frame, a conveyor fitted to one end of said frame and having an elevated discharge end, platform supporting structure having a leading edge adjacent the conveyor discharge, a horizontal shaft joining the platform supporting structure to the frame at a point substantially displaced laterally from the side of the platform support opposite the conveyor discharge, actuating means to raise and lower the platform supporting means between a level at which the platform supporting structure is tilted upwards to place its leading edge in abutting relation to the conveyor discharge and a substantially level position by rotation vertically about the shaft as an axis, a fence at right angles to the leading edge of the platform support, actuating means to raise and lower the fence, control means operated by lowering of the platform supporting structure to raise the fence, sensing means responsive to the contact of material on the platform supporting structure adjacent the conveyor discharge, and control means to lower the platform supporting structure only while the said sensing means detects said material.

15. A platform loading device comprising conveyor means having a discharge of predetermined height, a structure having platform supporting means adjacent the conveyor discharge, means for rotating the structure to dispose the platform supporting means between a substantially horizontal position and a tilting position in which one edge of said means is adjacent the conveyor discharge about a horizontal axis of rotation substantially below the discharge and displaced from the platform supporting means on the side opposite said discharge, control means for the rotating means, a first fence vertically mounted adjacent to the platform supporting means facing the conveyor discharge, a second fence movably mounted substantially at right angles to the first fence to enclose a second side of the platform supporting means, sensing means adjacent the conveyor discharge and operatively connected to the control means for the platform rotating means to permit the lowering of said platform whenever the presence of material is detected on said platform, and means actuated by lowering of the platform supporting means to a horizontal position to displace the second fence permitting a platform to be discharged.

16. A platform loading device comprising a frame, a conveyor fitted to one end of said frame having a discharge point at predetermined elevation, an elevating structure pivotally mounted to said frame at one end for rotation about a horizontal axis substantially below the conveyor discharge point and having at its other end adjacent the conveyor discharge point a platform supporting section, actuating means for the pivoted elevating structure, control means for the actuating means to vertically position the platform supporting section between the discharge point and a level position, a first fence vertically mounted to the platform supporting section of the elevating structure opposite the conveyor discharge, a second fence movably mounted to the frame, actuating means for the second fence, control means to position the said second fence substantially at right angles to the first fence and adjacent the platform in its elevated position, a sensing means on the second fence adjacent the conveyor discharge responsive to the presence of discharged material on the platform, said sensing means being operatively connected to the control means for the elevating structure to permit said structure to be lowered only when an object is detected by the sensing means, and control means actuated by the lowering of the platform supporting section to its horizontal position to raise the second fence permitting the platform to be discharged.

References Cited in the file of this patent
UNITED STATES PATENTS

| | | |
|---|---|---|
| 1,870,207 | Washburne | Aug. 2, 1932 |
| 2,613,824 | Tallman | Oct. 14, 1952 |